(12) United States Patent
Colas

(10) Patent No.: US 8,341,719 B2
(45) Date of Patent: Dec. 25, 2012

(54) SECURE TRANSMITTING METHOD, A SYSTEM, A FIREWALL, AND A ROUTER USING THE METHOD

(75) Inventor: Gilles Colas, Orsay (FR)

(73) Assignee: Sagem Defense Securite, Paris (FR)

( * ) Notice: Subject to any disclaimer, the term of this patent is extended or adjusted under 35 U.S.C. 154(b) by 922 days.

(21) Appl. No.: 11/302,976

(22) Filed: Dec. 14, 2005

(65) Prior Publication Data

US 2006/0130134 A1 Jun. 15, 2006

(30) Foreign Application Priority Data

Dec. 15, 2004 (FR) ..................................... 04 13354

(51) Int. Cl.
*G06F 9/00* (2006.01)
(52) U.S. Cl. .......................................................... 726/11
(58) Field of Classification Search ..................... 726/11
See application file for complete search history.

(56) References Cited

U.S. PATENT DOCUMENTS

2002/0188776 A1* 12/2002 Houlberg ........................ 710/62
2003/0126468 A1    7/2003 Markham

FOREIGN PATENT DOCUMENTS

| WO | WO 03/025766 A | 3/2003 |
| WO | WO 03/049400 A | 6/2003 |

OTHER PUBLICATIONS

French Preliminary Search Report FR 0413354; report dated Aug. 18, 2005.

* cited by examiner

*Primary Examiner* — Cordelia Zecher
(74) *Attorney, Agent, or Firm* — Miller, Matthias & Hull LLP

(57) ABSTRACT

Data packets are transmitted in a secure manner from an external network to a secure network. The secure network and the external network are interconnected via a firewall comprising a first interface with the external network and a second interface with the secure network. The firewall provides, over the second interface, a plurality of virtual interfaces. An association between items of specific information of the firewall and said virtual interfaces is stored in the firewall and in the secure network. It is determined whether to authorize the transmission of a packet received from the external network to the secure network on the basis of predefined security criteria. If the received packet is authorized, an item of specific information is selected to be transmitted to the secure network with the authorized packet. A virtual interface is then determined as a function of the item of specific information selected on the basis of the association. The authorized packet is then transmitted via the determined virtual interface. Thus, on reception of the packet in the secure network, the item of specific information can be deduced from the virtual interface through which the packet is received, on the basis of the association.

13 Claims, 3 Drawing Sheets

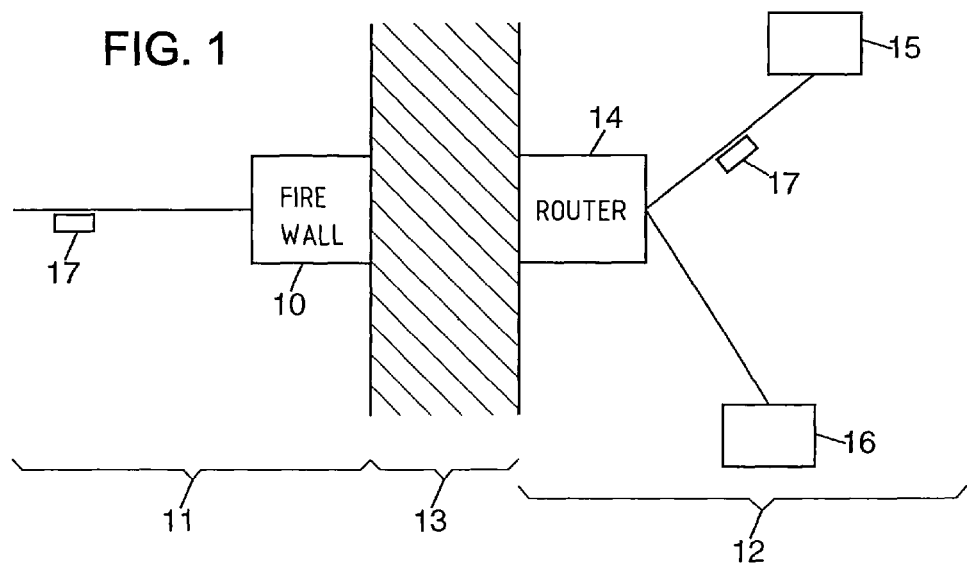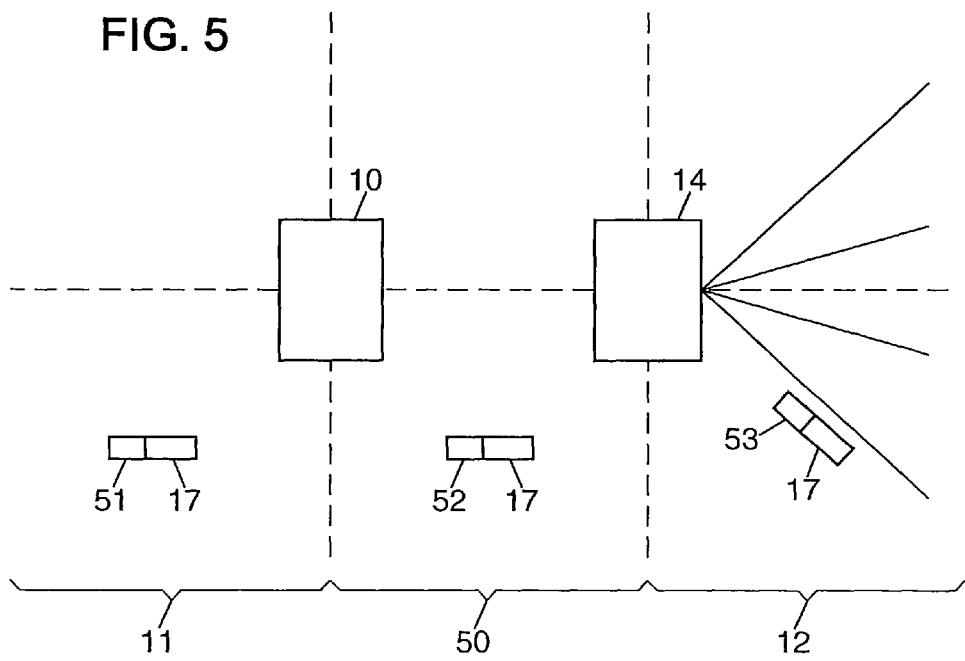

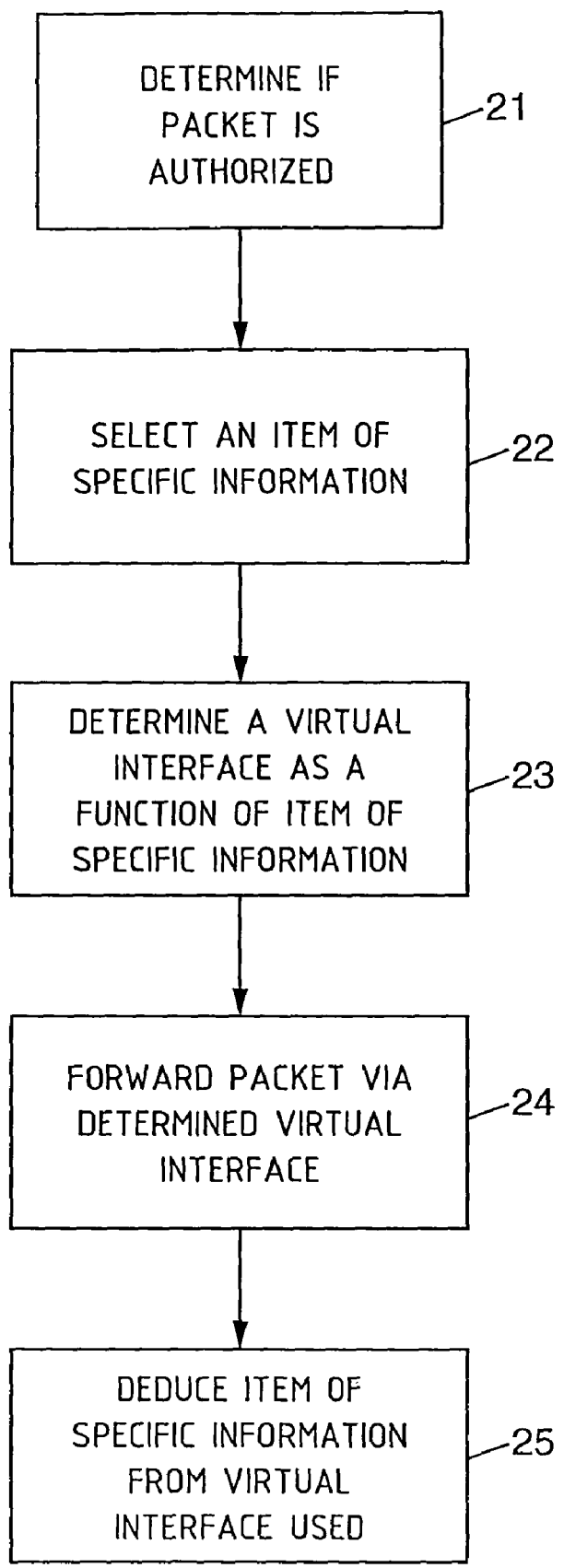

SECURE TRANSMITTING METHOD, A SYSTEM, A FIREWALL, AND A ROUTER USING THE METHOD

The present invention relates to secure networks and more particularly to electronic data processing security barriers, known as firewalls, which filter data streams from an external network before they are transmitted to a secure network.

BACKGROUND OF THE INVENTION

The term firewall conventionally designates either a unit dedicated to the firewall function or a logic system integrated into a unit having functions other than those of a firewall, for example software integrated into a computer. The firewall is intended to make a network secure by filtering data coming from an external network before transmitting it to the secure network.

The firewall decides whether to transmit data or not as a function of particular security criteria.

Conventionally, it has a first interface for communicating with units of the external network and a second interface for communicating with units of the secure network. To be more precise, the first interface receives and analyses data streams coming from the external network. The firewall then decides whether to authorize data received from the external network for transmitting to the secure network on the basis of that analysis and as a function of security criteria.

A firewall can use several types of filtering for this purpose. Whatever type of filtering the firewall uses, it provides some isolation between the secure network and the outside world.

If data conforms to the security criteria, the second interface transmits it to the security network.

If the external network is an Internet Protocol (IP) network, the data to be transmitted to the security network consists of IP packets. Subsequent references to this kind of external network are for illustration only and are not limiting on the scope of the invention.

For security reasons that are familiar to the person skilled in the art, the firewall is generally not authorized to modify an IP packet to be transmitted to the secure network.

Because of this, one problem in this field is transmitting information additional to the IP packet without degrading the level of security that the firewall offers the units of the secure network.

Now, in certain cases, it may be highly advantageous, and even of fundamental importance, to add to the packet to be transmitted information that is available to the firewall and that might be useful in the secure network.

In a conventional network architecture, the firewall transmits an authorized packet to the secure network through the intermediary of a secure network unit responsible for routing authorized packets in the secure network and known as a router. For example, in this kind of architecture, additional information available to the firewall may assist the router to route IP packets efficiently and correctly in the secure network. Several ways to supply the router with such additional information may readily be envisaged.

A first way is for the router to obtain the information available to the firewall from data received in the packet. However, the performance of the router may be degraded if obtaining this information requires complex and costly computation.

Another way is for the information available to the firewall to be transmitted directly to the router in the packet. However, by intrusively modifying the IP packet, this kind of manipulation might be hazardous to the secure network and might degrade the level of protection offered by the firewall.

A third way is for a protocol layer to be added to transmit the additional information from the firewall to the router. However, a new protocol layer implies costly and complex modifications to the units responsible for transporting the additional information.

OBJECTS AND SUMMARY OF THE INVENTION

The invention aims to solve the above problems.

To this end, a first aspect of the invention proposes a method of transmitting data packets from an external network to a secure network.

The secure network and the external network are interconnected via a firewall comprising a first interface with the external network and a second interface with the secure network.

The firewall also provides, over said second interface, a plurality of virtual interfaces.

An association between items of specific information available to the firewall and the virtual interfaces is stored in the firewall and in the secure network.

The method comprises the following steps:

a) determining whether to authorize transmitting of a packet received from the external network to the secure network on the basis of predefined security criteria;

b) if the received packet is authorized, selecting an item of specific information to be transmitted to the secure network with the authorized packet;

c) determining a virtual interface from said plurality of virtual interfaces, as a function of the item of specific information selected on the basis of said association;

d) transmitting the authorized packet via the determined virtual interface; and e) on reception of the packet in the secure network, deducing said item of specific information from the virtual interface through which the packet is received, on the basis of said association.

In one embodiment of the present invention the secure network comprises a router and a plurality of network units.

In an architecture of this kind, the second interface of the firewall is connected to the router.

Thus the router can route the authorized packet as a function in particular of the item of specific information deduced in step e).

The secure network may provide different types of service each associated with one or more units of the secure network. Each item of specific information may then correspond to one of said different types of service.

A virtual physical address may be associated with each virtual interface. The firewall then emulates a plurality of virtual physical interfaces.

In this case, in step d), the authorized data packet is transmitted via a protocol layer indicating the virtual physical address associated with the virtual interface determined in step c).

A second aspect of the present invention proposes a system for transmitting data packets from an external network to a secure network, which system comprises a firewall and a router each comprising means for implementing the method according to the first aspect of the present invention.

A third aspect of the present invention proposes a firewall adapted to operate in a system according to the second aspect of the present invention.

A fourth aspect of the present invention proposes a router adapted to operate in a system according to the second aspect of the present invention.

A fifth aspect of the present invention proposes a computer program product adapted to be stored in a memory of a firewall and/or a router or on a removable storage medium and comprising instructions for executing some or all steps of the method conforming to the first aspect of the present invention.

BRIEF DESCRIPTION OF THE DRAWINGS

Other features and advantages of the invention become apparent on reading the following description, which is purely illustrative and should be read with reference to the appended drawings, in which:

FIG. 1 shows a network architecture comprising one embodiment of a firewall of the present invention interfacing with an external network and a secure network;

FIG. 2 shows the main steps of one embodiment of the transmission method of the present invention;

FIG. 5 shows in detail the transmitting of a packet in accordance with one embodiment of the present invention.

MORE DETAILED DESCRIPTION

Figure 3:
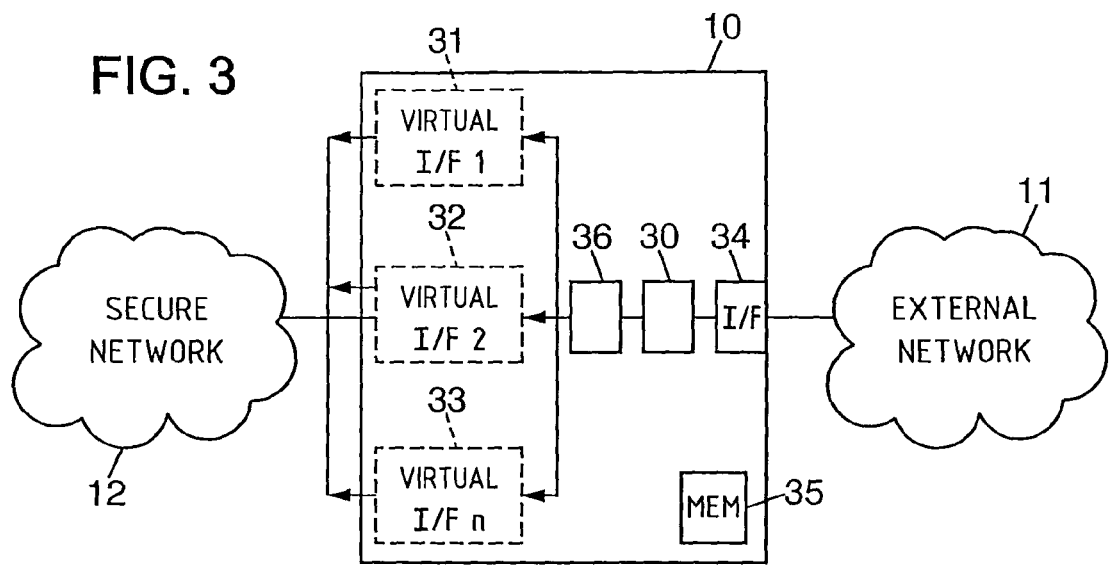
FIG. 3 shows in detail the architecture of one embodiment of a firewall of the present invention.

The external network referred to below is an IP network, but this example is not limiting on the invention.

One objective of the present invention is to transmit a packet coming from an external network combined with additional information available to the firewall with a guaranteed very high level of security against possible attack on the secure network from the external network.

FIG. 1 shows a firewall 10 of this kind between an external network 11 and a secure network 12.

The firewall 10 may be considered as a kind of fuse protecting the secure network. It authorizes transmitting of packets received from the external network to the secure network if those packets conform to predefined security criteria. It then transmits the authorized packets to the secure network. In the architecture shown in FIG. 1, the secure network comprises a router 14 which receives packets authorized by the firewall.

An area 13 between the firewall 10 and the router 14 is conventionally referred to as the "demilitarized zone". An Ethernet protocol is preferably used in this demilitarized zone between the firewall 10 and the router 14.

The security provided by the firewall relies on the independent operation of the firewall 10 and the router 14.

Note that the invention covers any type of protocol for the external network and the secure network.

Accordingly, in an architecture of the above kind, a packet 17 sent from the external network to the secure network and conforming to defined security criteria is transmitted to the secure network.

FIG. 2 shows the main steps of transmitting via one embodiment of a firewall of the present invention.

Items of specific information are available to the firewall. Each of these items of information may correspond to respective defined parameters, so that the firewall is able to associate one of the items of specific information with a received packet if that packet conforms to the respective defined parameters. The firewall also manages a plurality of virtual interfaces with the secure network.

In one embodiment of the present invention, each of the items of specific information corresponds to one of these virtual interfaces. This correspondence is advantageously known to the firewall and also to the router 14.

Accordingly, in step 21, on receiving a packet sent in the external network, whether to authorize transmitting it to the secure network is decided first, on the basis of predefined security criteria.

The functioning of the systems constituting the firewall may then be based on an IP packet filtering principle. Headers of the IP packets exchanged are analyzed.

When an external network unit connects to a secure network unit, and vice-versa, the data packets received by the firewall contain the following headers:

the source IP address of the sending unit,
the destination IP address of the receiving unit,
the packet type (TCP, UDP, etc.), and
the source port number and the destination port number respectively referencing the packet source and destination application or service.

The IP addresses contained in the packets identify the sending unit and the receiving unit, and the packet type and the port number indicate the type of protocol used in the Internet network. A firewall can thus apply address filtering based on IP addresses.

It may also apply filtering based on the type of protocol used, by analyzing the packet type and the ports corresponding to the IP packets in transit.

Many protocols used on the Internet, such as the FTP, for example, are used to initiate a connection to a static port and to open a port dynamically in order to establish a session between the unit initiating the session, which then plays the client role, and another unit, which then plays the server role. In this kind of situation, it is impossible to apply filtering as a function of the ports because the ports are opened dynamically and therefore have a random character. In this case, the firewall can apply dynamic filtering.

The present invention covers all types of filtering.

In a step 22, for an authorized received packet, an item of specific information is selected from the items of specific information available to the firewall as a function of defined parameters. This selection may be based on information received from the external network relating to the authorized packet.

It is therefore possible to determine, for data relating to a packet conforming to certain defined parameters, that it is advantageous, or even of fundamental importance, to transmit a specific item of information to the secure network along with the packet itself.

The items of specific information may in particular correspond to different types of service in the secure network.

Once the item of specific information to be transmitted to the secure network with the packet has been selected, in a step 23, there is deduced from this a virtual interface via which the firewall is to transmit the packet to the secure network.

There is preferably a virtual interface corresponding to each item of specific information.

Then, in a step 24, the firewall transmits the packet, preferably without modifying its content, via the virtual interface determined in this way.

When the packet is received in the secure network, in a step 25, the item of specific information corresponding to the received packet is determined. Knowing the association between a virtual interface and an item of specific information, the secure network is able to deduce the item of specific information as a function of the virtual interface used to transmit the packet in the demilitarized zone.

The firewall is therefore able in this case to transmit another item of information with the packet, without having to modify the packet and without adding an additional protocol layer.

FIG. 3 shows in detail the architecture of one embodiment of a firewall 10 of the present invention.

The firewall 10 comprises a first interface unit 34 with the external network 11. This first interface unit comprises means for determining whether to authorize transmitting of a packet received from the external network to the secure network on the basis of predefined security criteria.

The firewall also comprises a second interface unit with the secure network, providing a plurality of virtual interfaces 31, 32, 33 and adapted to transmit an authorized packet to the secure network.

The firewall preferably comprises, between the two interface units, a selection unit 30 for selecting an item of specific information to be transmitted to the secure network with the authorized packet as a function of defined parameters and a determination unit 36 for determining one of said plurality of virtual interfaces as a function of the selected item of specific information.

The firewall further comprises a memory 35 for storing items of specific information and an association between those items of specific information and the virtual interfaces. That association is advantageously shared with the router of the secure network. Consequently, the router is then capable of deducing the associated item of specific information from the interface through which it receives a packet.

Figure 4:
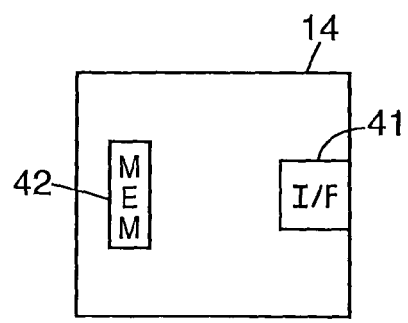
FIG. 4 shows in detail the architecture of one embodiment of a router of the present invention.

FIG. 4 shows one embodiment of a router 14 of the present invention.

In one embodiment of the invention, the router 14 in the secure network comprises a memory 42 adapted to store an association between the items of specific information and the virtual interfaces.

The firewall and the router may be supplied with that information association during their configuration, for example.

The router also comprises an interface unit 41 with the firewall adapted to receive packets and to deduce an item of specific information from the virtual interface through which the packet is received, based on the stored association.

The router is preferably then able to take account of the additional information to route the received packet as a function of the specific item of information.

If the secure network is an avionic network in the cockpit of an aircraft, different services may be offered in that network, in particular services relating to control of the aircraft and services relating to printing. In this case, the items of specific information can assist the router to route the packets more efficiently and more reliably as a function of the service to which they relate. Accordingly, the firewall comprises means for determining, on the basis of data relating to a packet to be transmitted to the secure network, if that packet relates to an aircraft control service or to a printing service, i.e. is addressed to a printer, for example. The operation of determining to which service a packet relates may involve costly computation.

Accordingly, in this kind of application, it may be highly advantageous to send this information from the firewall 10 to the router 14.

FIG. 5 shows, in one embodiment of the present invention, transmitting from the IP external network 11 to the secure network 12 via an Ethernet-type network 50 between the firewall 10 and the router 14. The firewall emulates a plurality of virtual interfaces by associating a virtual physical address with each of the virtual interfaces.

In this way the IP packet is encapsulated by a protocol layer that associates with it a virtual physical address corresponding to the virtual interface determined for transmitting it.

Accordingly, a packet 17 is received by the firewall 10 in the IP network. That IP packet is associated with a source physical address 51, in accordance with encapsulation principles familiar to the person skilled in the art. The firewall authorizes transmitting of that packet to the secure network and then selects an item of specific information to be transmitted to the secure network with the packet. It then determines a virtual interface on the basis of the selected item of specific information.

It then associates the IP packet with the virtual physical address 52 corresponding to the virtual interface that has been determined. That physical address may correspond to a virtual media access control (MAC) address.

Then, on receiving this packet, the router analyses the physical address associated with the received IP packet and deduces the corresponding item of specific information on the basis of the association of the virtual interfaces with the items of specific information.

The present invention is advantageously used to protect a network against attack from external networks.

The co-operation of a firewall and a router conforming to the invention offers a relatively high level of security and remains easy to implement.

The level of security offered by the invention allows application to avionic networks.

Avionic networks comprise units that require a very high level of security if they are connected with the outside world, such as units relating to aircraft control in particular.

The secure network may be a network employing one of the networks used in avionic networks. One such protocol is an Avionics Full DupleX (AFDX) protocol for transporting Ethernet data in an avionic network.

Another avionic network protocol is the protocol standardized by Aeronautical Radio Incorporated (ARINC).

It is also easy to apply an embodiment of the present invention to an architecture in which the firewall 10 is interfaced on the secure network side to an avionic network of a first type (for example AFDX) and to an ARINC network.

What is claimed is:

1. A method of transmitting data packets from an external network to a secure network, the method comprising: interconnecting the secure network and the external network via a firewall, providing said firewall with a first interface with the external network and with a second interface with the secure network, providing, by said firewall, over said second interface, a plurality of virtual interfaces, storing, in said firewall, associations between items of specific information of the firewall and said virtual interfaces, storing in said secure network, associations between items of specific information of the firewall and said virtual interfaces, connecting the second interface of the firewall to a router of the secure network, and:

a) determining, by the firewall, whether to authorize the transmission of a packet received from the external network to the secure network on the basis of predefined security criteria, the received packet comprising source and destination IP addresses and source and destination ports;
   b) if the received packet is authorized, selecting, by the firewall, an item of specific information to be communicated to the secure network by way of the unmodified contents of the authorized packet, wherein an association between the selected item of specific information and a virtual interface is stored in the firewall and in the secure network;

c) determining, by the firewall, said virtual interface from said plurality of virtual interfaces, as a function of the item of specific information selected on the basis of said association;

d) transmitting, by the firewall, the unmodified authorized packet via the determined virtual interface;

e) on reception of the unmodified authorized packet in the secure network, deducing, by said router of the secure network, said item of specific information from the virtual interface through which the unmodified authorized packet is received, on the basis of said association; and f) routing by said router, the unmodified authorized packet as a function notably of the item of specific information deduced in step e).

2. A method according to claim 1, wherein the secure network provides different types of service each associated with one or more units of the secure network and wherein each item of specific information corresponds to one of said different types of service.

3. A method according to claim 1, wherein a virtual physical address is associated with each virtual interface and wherein, in step d), the authorized data packet is transmitted via a protocol layer indicating the virtual physical address associated with the virtual interface determined in step c).

4. A method according to claim 1, wherein step b) is executed on the basis of data relating to said packet and predefined parameters.

5. A method according to claim 1, wherein the secure network is an avionic network based on an ARINC protocol and/or an AFDX protocol.

6. A computer program product for execution in a processing unit of a firewall and/or router comprising instructions for executing the method according to claim 1 when executed in said processing unit.

7. A system for transmitting data packets from an external network to a secure network, the secure network and the external network being interconnected via a firewall comprising a first interface with the external network and a second interface with a router of the secure network, said firewall further comprising:

a first interface unit with the external network comprising means for determining whether to authorize the transmission of a packet received from the external network to the secure network on the basis of predefined security criteria, said received packet comprising source and destination IP address and source and destination port;

a second interface unit with the secure network, providing a plurality of virtual interfaces and adapted to transmit an unmodified authorized packet to the secure network;

a memory adapted to store items of specific information and associations between said items of specific information and said virtual interfaces;

a selection unit adapted to select an item of specific information to be communicated to the secure network by way of the unmodified contents of the authorized packet, wherein an association between the selected item of specific information and a virtual interface is stored in the firewall and in the secure network; and a determination unit for determining said virtual interface from said plurality of virtual interfaces as a function of the item of specific information selected on the basis of said association; and said router comprising:

a memory for storing said association between the items of specific information and the virtual interfaces; and an interface unit with the firewall adapted to receive unmodified authorized packets, to deduce an item of specific information from the virtual interface through which the unmodified authorized packet is received, on the basis of said association, and to perform routing as a function of said item of specific information.

8. A system according to claim 7, wherein the secure network provides different types of service each associated with one or more units of the secure network and wherein each item of specific information corresponds to one of said different types of service.

9. A system according to claim 7, wherein a virtual physical address is associated with each virtual interface and wherein the firewall transmits the authorized packet via a protocol layer indicating the virtual physical address associated with the determined virtual interface.

10. A system according to claim 7, wherein the firewall selects an item of specific information on the basis of data relating to said packet and predefined parameters.

11. A system according to claim 7, wherein the secure network is an avionic network based on an ARINC protocol and/or an AFDX protocol.

12. A firewall as defined in claim 7.

13. A router as defined in claim 7.

* * * * *